(12) United States Patent
Suryanarayana et al.

(10) Patent No.: US 6,487,401 B2
(45) Date of Patent: Nov. 26, 2002

(54) PREPAID WIRELESS TELEPHONE ACCOUNT REGENERATION IN A WIRELESS ACCESS PROTOCOL SYSTEM

(75) Inventors: Lalitha Suryanarayana, Austin, TX (US); Jim H. Chan, Austin, TX (US); Richard Carl Schmidt, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 96 days.

(21) Appl. No.: 09/740,162

(22) Filed: Dec. 18, 2000

(65) Prior Publication Data

US 2002/0077076 A1 Jun. 20, 2002

(51) Int. Cl.$^7$ .............................................. H04M 11/00
(52) U.S. Cl. ....................... 455/406; 455/408; 379/230; 379/114.01
(58) Field of Search ................................ 455/405, 406, 455/407, 408, 409, 411, 420, 461; 379/111, 114.01, 114.03, 114.05, 114.16, 114.17, 114.2, 201.01, 230, 144.01

(56) References Cited

U.S. PATENT DOCUMENTS 5,592,535 A * 1/1997 Klotz ......................... 455/406
5,978,456 A    11/1999 Takeuchi
5,991,748 A    11/1999 Taskett
6,167,251 A    12/2000 Segal et al.
6,188,752 B1    2/2001 Lesley
6,333,976 B2 * 12/2001 Lesley ................... 379/114.01
6,363,411 B1 *  3/2002 Dugan et al. ............... 379/201
6,397,055 B1 *  5/2002 McHenry et al. ........... 455/408
6,404,869 B1 *  6/2002 Henderson et al. ..... 379/144.01

* cited by examiner

Primary Examiner—Nay Maung
(74) Attorney, Agent, or Firm—Brinks Hofer Gilson & Lione

(57) ABSTRACT

A service control point transmits a recharge request message or advice of charge to a mobile client resident in a wireless communications device. The message is first received by a wireless telephony application server that then forwards the message to a wireless access protocol gateway. The wireless access protocol gateway then sends the request to the mobile client. The user of the mobile client responds with an affirmative or negative answer to the request to recharge the prepaid telephone airtime account. The service control point then either recharges the account as instructed or lets the account expire, depending on the response from the user.

37 Claims, 8 Drawing Sheets

100

PREPAID WIRELESS TELEPHONE ACCOUNT REGENERATION IN A WIRELESS ACCESS PROTOCOL SYSTEM

BACKGROUND OF THE INVENTION

I. Field of the Invention

The present invention relates generally to wireless communications. Particularly, the present invention relates to Wireless Access Protocol (WAP) enabled devices.

II. Description of the Related Art

The capability of wireless telephones is rapidly increasing. Wireless telephones now have the ability to access the Internet using a microbrowser that is part of the telephone. The microbrowser is a very simple version of personal computer browsers such as MICROSOFT'S INTERNET EXPLORER and NETSCAPE'S NETSCAPE COMMUNICATOR.

This mobile Internet browsing capability is in the process of being standardized through a Wireless Access Protocol (WAP) forum that is setting the rules for communicating in a wireless manner with the Internet and the World Wide Web. A language designed for this type of communication is the wireless markup language (WML). This language is a simplified version of the Web language, hypertext markup language (HTML). An XML application, WML was designed for wireless communication devices with small, low-resolution screens that are prevalent on cellular telephones.

Prepaid cellular calling accounts are used by consumers who do not want to enter long-term contracts with service providers or who have bad credit and cannot qualify for a postpaid service account. Generally, the consumer pays an up-front amount to open the account and receives a predetermined amount of airtime.

The consumer prefers to track the amount of time remaining in his account. If the account is depleted while the consumer is on a call, the call in progress may be cut-off or the consumer's account may be hit with additional charges for going over the prepaid limit. There is a resulting unforeseen need for a process to recharge a prepaid cellular account.

DETAILED DESCRIPTION OF THE PREFERRED EMBODIMENT

The present invention provides a cellular telephone user with the ability to recharge their prepaid service account at any time. The account can even be recharged while the user is conducting a call without interrupting the user.

The preferred embodiment of the present invention uses a Wireless Access Protocol (WAP) capable cellular telephone; alternate embodiments do not require the telephone to be WAP capable. Any PCS or advanced mobile phone service (AMPS) type cellular telephone operating with a prepaid airtime account will work.

WAP capable cellular telephones are becoming more popular due to the information delivered to the cellular telephone (anytime and anywhere) and options available to the user. The WAP capable cellular telephone is comprised of Web browser-type software that enables the cellular telephone user to access and receive information over the Internet in addition to controlling the operation of the telephone.

The WAP protocol and architecture discussed herein is well known in the art. A further discussion of WAP is available from the WAP Forum. Most documents generated by the WAP Forum are available over the Internet at the WAP Forum's Website: www.wapforum.com.

Figure 1:
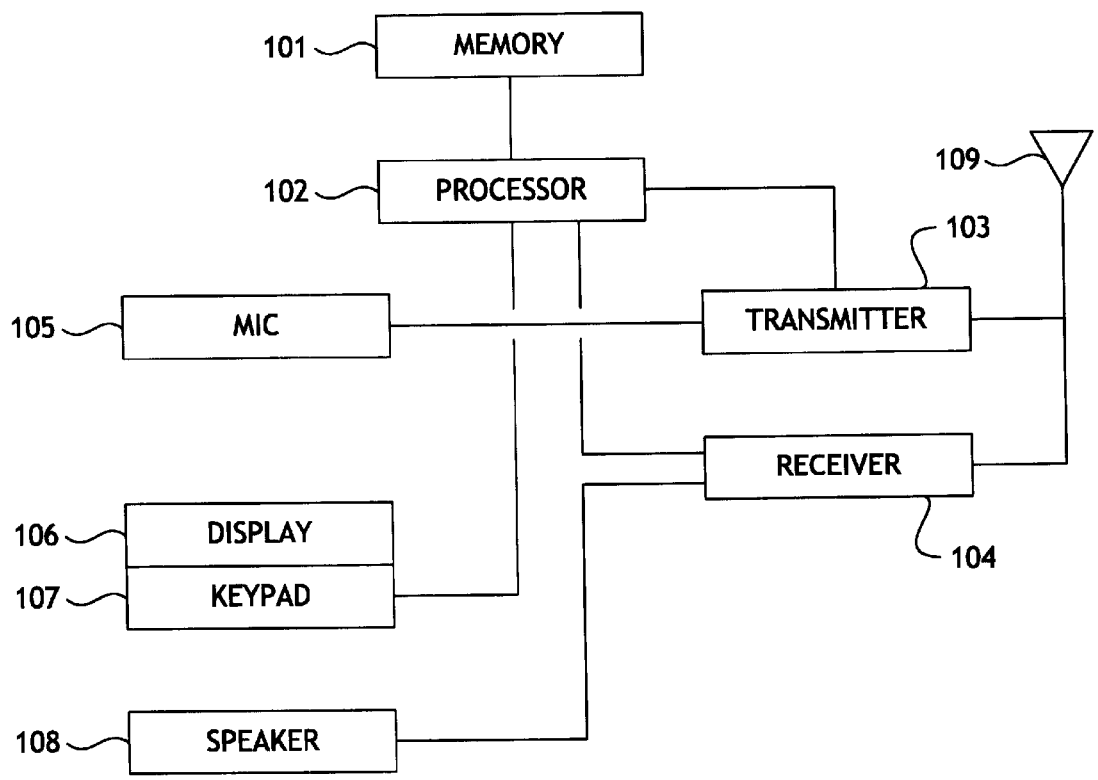
FIG. 1 shows a block diagram of a cellular telephone in accordance with the present invention.

FIG. 1 illustrates a block diagram of a typical WAP capable cellular telephone (100). The telephone (100) is comprised of a microphone (105) for converting a voice signal to an electrical signal for transmission by the transmitter (103) and radiated over the antenna (109). Signals received by the antenna (109) are received and demodulated by the receiver (104) before being converted to an aural signal by the speaker (108). The telephone user inputs information and operates the telephone by the keypad (107). The display (106) shows the user what was input on the keypad (107) as well as information that was received by the receiver (104).

A processor (102) that is coupled to memory (101) controls the cellular telephone (100). The processor scans the keypad (107) for inputs, displays appropriate data on the display (106), and controls the transmission and reception of data.

The processor (102) is also responsible for running any client software processes used by the mobile telephone. For example, since the telephone is WAP enabled, the processor (102) runs the Web browser-type process that communicates data over the Internet. The Web browser-type process is responsible for sending and retrieving e-mails, accessing Web pages for information, and sending information to a Web site.

The Web browser-type process is a smaller version of the Web browser programs written for personal computers. These include programs such as INTERNET EXPLORER and NETSCAPE'S NAVIGATOR. The Web browser-type process for the WAP capable telephone is required to be smaller in size in order to fit in the memory of the telephone. This browser-type process also must download Web pages for a substantially smaller screen on the telephone than that used in a typical personal computer. This Web browser-type process is well known in the art and is not discussed further herein.

While the preferred embodiment of the present invention is described as using the WAP capable cellular telephone (100) of FIG. 1, other types of WAP capable wireless communication devices also operate effectively with the process of the present invention. As an example, in an alternate embodiment, a WAP capable personal digital assistant (PDA) that operates in a wireless fashion can be substituted for the cellular telephone. The present invention operates with any wireless device capable of running a mobile client process to interact with the WAP system.

Figure 2:
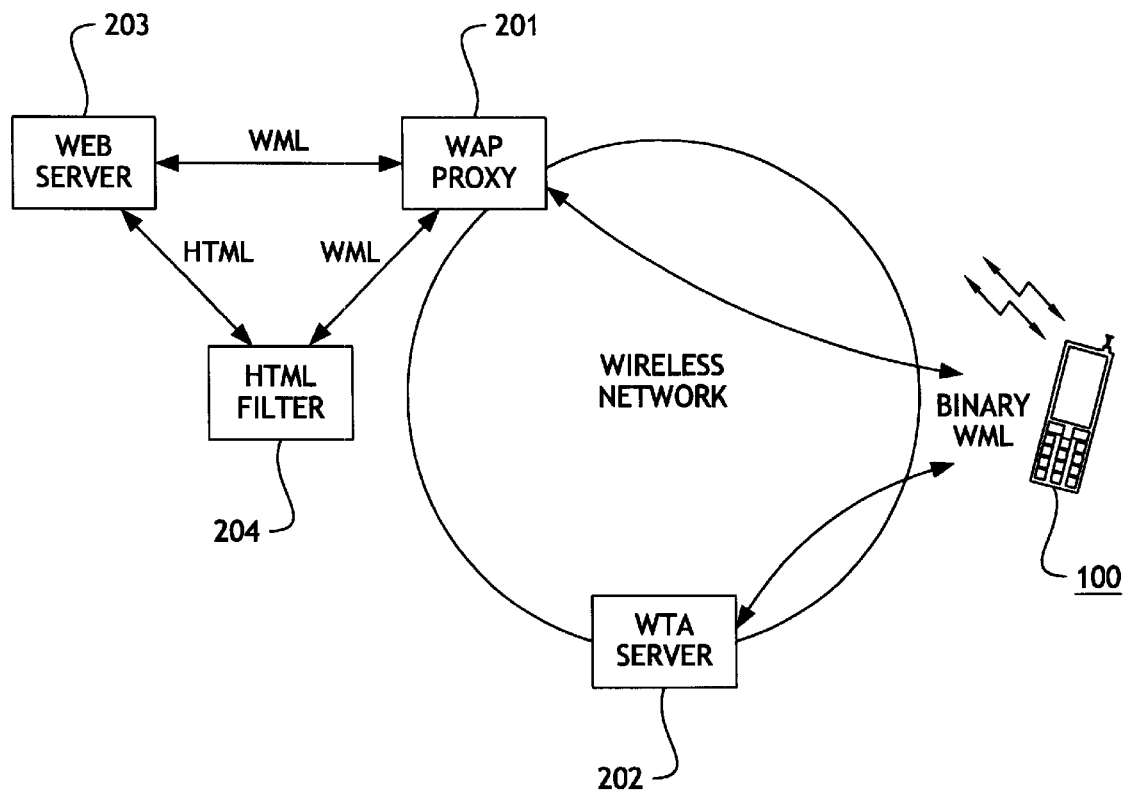
FIG. 2 shows a block diagram of a typical Wireless Access Protocol (WAP) system using a WAP capable cellular telephone of the present invention.

FIG. 2 illustrates a block diagram of a WAP network of the present invention. This network is comprised of the WAP capable cellular telephone (100) illustrated in FIG. 1. The cellular telephone (100) communicates with the wireless cellular network (205). The network (205) is comprised of a large number of fixed antennas coupled to low power transmitters. Each antenna radiates into a segmented (depending on the number of directional antennas employed) 360° area. Examples of such networks are an AMPS cellular network, a GSM cellular network, and a CDMA PCS networks. The cellular network of the present invention is well known in the art and will not be discussed further.

The wireless network (205) allows the telephone (100) to communicate with a WAP gateway proxy (201). As is well known in the art, a proxy is an intermediary program that acts as both a server and a client for the purpose of making requests on behalf of other clients, such as the telephone (100) in the present embodiment. The proxy typically resides between clients and servers that have no means of direct communication (e.g., across a firewall). Requests are either serviced by the proxy program or passed on, with possible translation, to other servers.

In the present embodiment, the WAP proxy (201) translates the WAP requests from the telephone (100) to the protocol used by the World Wide Web. This allows the telephone (100) to submit requests for information to the Web server (203). The proxy (201) also encodes the response from the Web server (203) into the compact binary format understood by the telephone (100).

WAP capable devices access web servers that communicate using HTTP in order to render WML and WMLscript content to the devices. WML is an application of XML. WML is required due to the reduced capabilities of the WAP capable wireless devices as well as the constraints imposed by the low bandwidth wireless networks as compared to a personal computer with substantially more memory and processing power and accessing the Internet over higher speed connections.

If the Web server (203) provides WAP content, the WAP proxy (201) retrieves it directly from the Web server (203). However, if the Web server (203) provides WWW content (such as HTML), an HTML filter (204) is used to translate the WWW content into the WAP content. For example, the HTML filter (204) would translate HTML into WML. The telephone (100) then accesses the WWW content from the WAP proxy (201).

The Web server (203) stores the information and Web pages that are accessed by both WAP devices and typical personal computers over the Internet. For purposes of clarity, only one Web server (203) is shown in FIG. 2. In reality, depending on the information required by the telephone (100), multiple Web servers are needed. Each Web server may reside at a different site and be operated by a different company. While the preferred embodiment illustrates the WAP proxy (201) and Web server (203) as being separate entities, alternate embodiments include a WAP gateway function as part of the Web origin server serving the content.

A Wireless Telephony Application (WTA) (202) server is a special kind of origin server that communicates with the WAP telephone (100) directly. The WTA server (202), therefore, operates in the WML format. The WTA server (202) provides WAP access to features of the wireless network provider's telecommunications infrastructure. For example, the network provider may provide storage of telephone numbers and addresses for the telephone user. The user can then access these numbers through the WTA server (202) using the telephone's browser.

Figure 3:
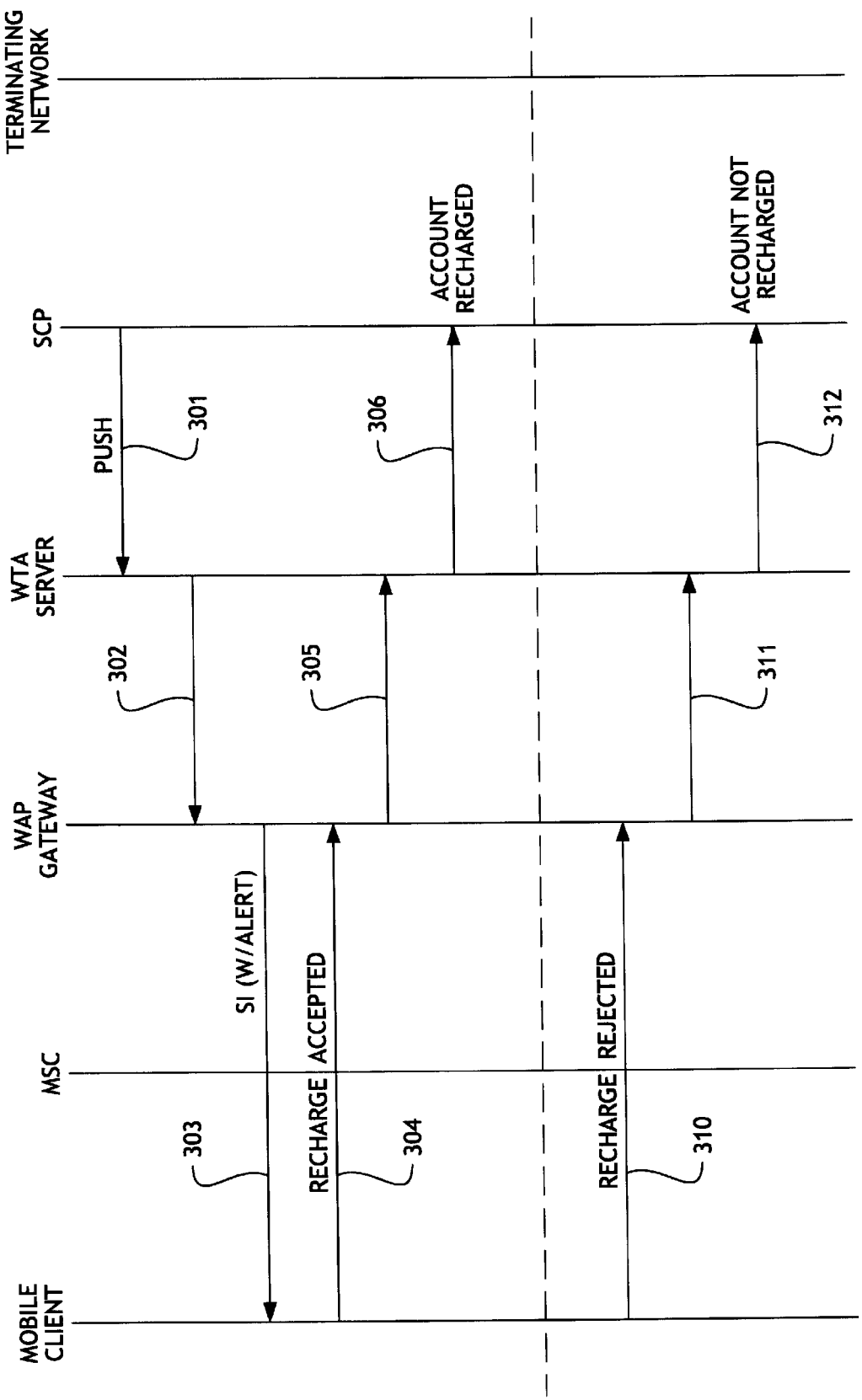
FIG. 3 shows "push" call flow diagram of the present invention.

FIG. 3 illustrates a call flow diagram of the prepaid account recharge process of the present invention. The process starts by the service control point (SCP) performing a push operation (301) to inform the cellular telephone user that a recharge of the prepaid account may be required. The SCP is a control server that can be queried during call processing. The SCP has the ability to signal back, to network elements, modifications to the handling of disposition of a call or session.

The push operation (301) is not required to take place during a call. The push operation (301) suggesting that the user recharge his account may be done at any time. Additionally, if the user is conducting a call that is not prepaid, the push operation may still take place.

The ability to perform the push operation (301) outside of a prepaid call gives the service provider the ability to advertise promotions if the user decides to recharge according to the promotion's rules. For example, the service provider may be offering a 10% discount for all prepaid account users who recharge their accounts within the next three hours. In fact, the user's prepaid account does not necessarily have to be close to depletion for the service provider to take advantage of the push operation.

The SCP sends a push signal (containing the recharge information) to the WTA server. Using WAP Push, the WTA server forwards the push signal (302) to the WAP gateway. The WAP gateway sends this Service Indication signal over the air (303) to the WTA client in the mobile terminal.

In an alternative embodiment, the recharge application is available at a URL on the WTA server. In this case, the Push service Indication sent to the client includes only the URL. The client then retrieves (pulls via WSP/HTTP GET) the content associated with the recharge notification.

At this point, the call flow of FIG. 3 depends on whether the user wishes to recharge his or her prepaid account. The process the user goes through to accept or reject the recharge is illustrated subsequently in reference to FIG. 6.

Referring again to FIG. 3, if the user accepts the recharge notification, the mobile client sends a "recharge accepted" signal (304) to the WAP gateway for forwarding (305) to the WTA server. The WTA server forwards the acceptance signal (306) to the SCP.

The SCP now recharges the prepaid account. In the preferred embodiment, the account is recharged a predetermined amount that the user and the service provider agreed upon in advance or the user has configured through automated means (such as part of personalization profile). In alternate embodiments, the user has the option of entering an amount to which he wants the account recharged. This amount is transmitted back to the SCP along with the acceptance signal. The SCP then recharges the account to this level.

In the preferred embodiment, the SCP sends an acknowledgement back to the mobile client, through the WTA server and WAP gateway, for display to the user that a recharge for a certain amount has indeed taken place. In an alternate embodiment, the acknowledgement is not given and the user must assume that the recharge has occurred.

If the user rejects the recharge request from the SCP, the mobile client sends the rejection signal (310) to the WAP gateway for forwarding (311) to the WTA server. The WTA server sends the rejection (312) to the SCP. In this case, the SCP does not recharge the account and no acknowledgement is necessary in the preferred embodiment. In an alternate embodiment, the SCP acknowledges that the account will not be recharged and lists the current prepaid level.

Figure 4:
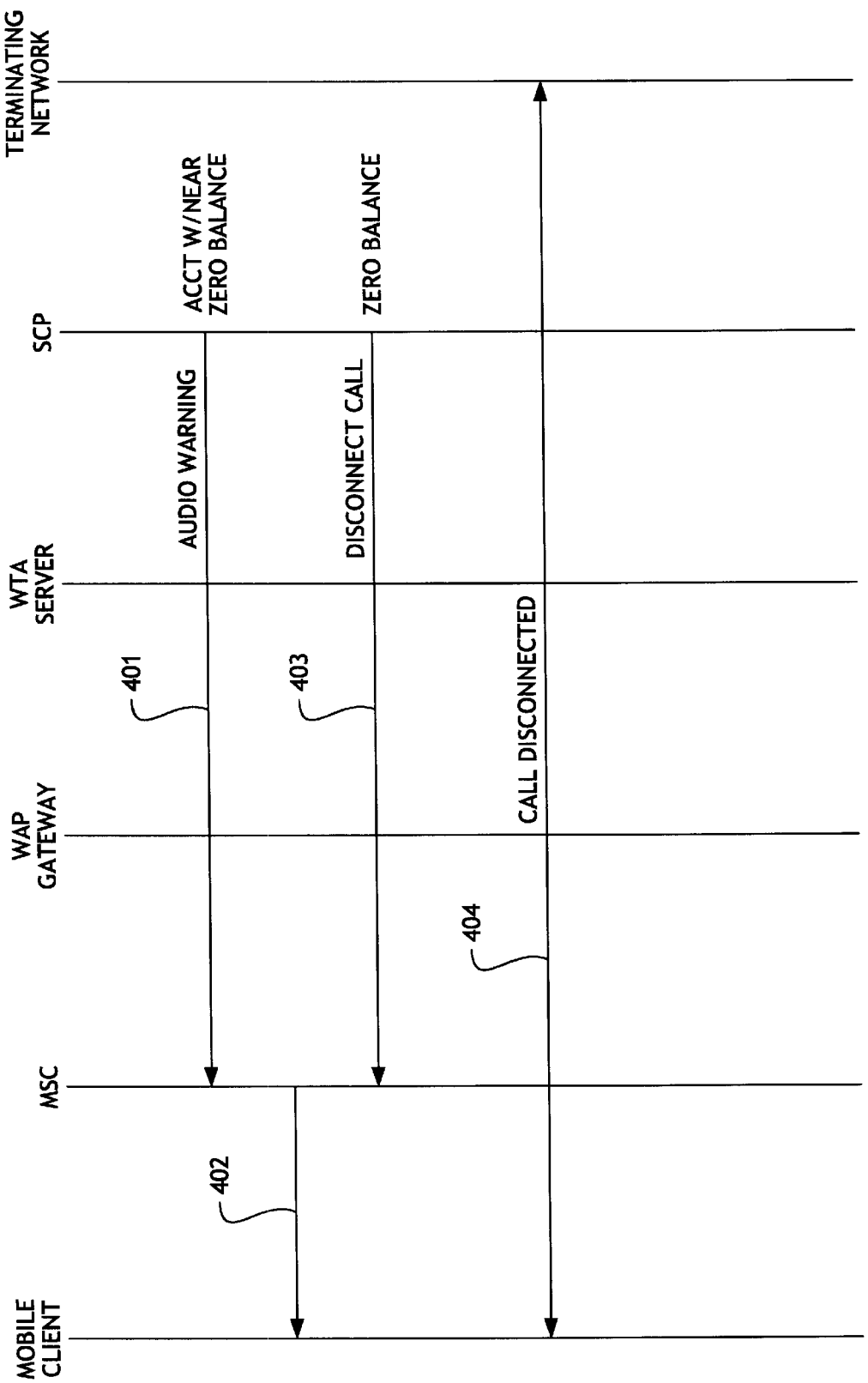
FIG. 4 shows an "in call" call flow diagram of the present invention.

In another scenario of the prepaid account recharge process of the present invention, the user rejects the recharge request from the SCP and prepaid funds are depleted. In this case, which is illustrated in FIG. 4, the SCP tracks the user's account level while the call is in process. When the account reaches a predetermined level, the SCP sends out a warning signal to the user's mobile client. This scenario occurs for both WAP enabled mobile clients and non-WAP enabled mobile clients.

In the preferred embodiment, the predetermined level at which the warning signal is initiated is set at the time the user signs up for the prepaid account. Alternatively, it can be configured dynamically if the user's preference changes over time. This level may be a monetary level or it may be a predetermined number of minutes remaining, depending on whether the user signed up for a set dollar amount or a set number of minutes.

If the user is in a call, the warning signal transmitted to the mobile client (401) must first go to the mobile switching center (MSC) that is responsible for the area in which the telephone is operating. The MSC is aware of which base station the telephone is communicating so that the signal can be transmitted (402) to the telephone's mobile client.

The warning signal transmitted to the mobile client, in the preferred embodiment, takes the form of a text message informing the user that he now has a certain number of dollars or minutes remaining before being disconnected, assuming the user is in a call. If the user signed up for a set dollar amount, the system, knowing the current airtime rate, also sends an estimate of the time remaining for that set dollar amount.

If the user is not in a call and a push message is being performed, it can take place at any time: during a promotion or when the balance reaches a predetermined threshold.

If the user does not choose to recharge the account by the time it reaches zero, the SCP transmits a "disconnect call" message (403) to the MSC. The MSC then goes through the required steps to disconnect the user's call (404). This call disconnect process is well known in the cellular telephone art and is not described further.

Figure 5:
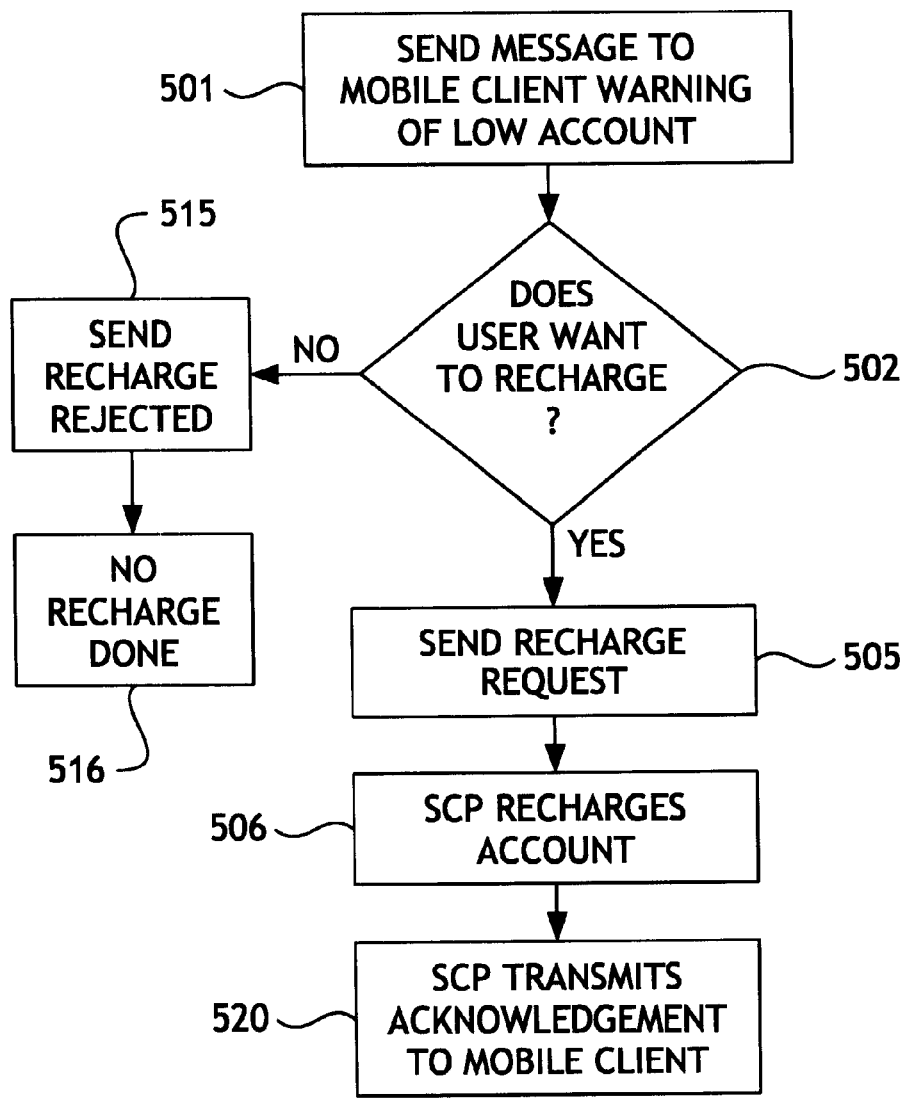
FIG. 5 shows a flowchart of the prepaid account recharge process of the present invention.

FIG. 5 illustrates the prepaid account recharge process of the present invention. The process starts by the SCP sending a message to the mobile client software via the WAP network (step 501). If the telephone user wishes to recharge the account (step 502), he instructs the mobile client software to send a "recharge accepted" message back to the SCP via the WAP network (step 505). The SCP then recharges the account for the desired amount (step 506).

In the preferred embodiment, the SCP, after recharging the account, sends an acknowledgment back to the mobile client indicating the account has been recharged for the agreed upon value. This message is not shown in the call flow diagram of FIG. 3 for purposes of clarity since it is not required and is performed in substantially the same way as any other message from the SCP to the mobile client.

If the telephone user does not wish to recharge the account (step 502), he instructs the mobile client software to send a "recharge rejected" message back to the SCP via the WAP network (step 515). The SCP does not recharge the account after receiving this message (step 516).

Figure 6:
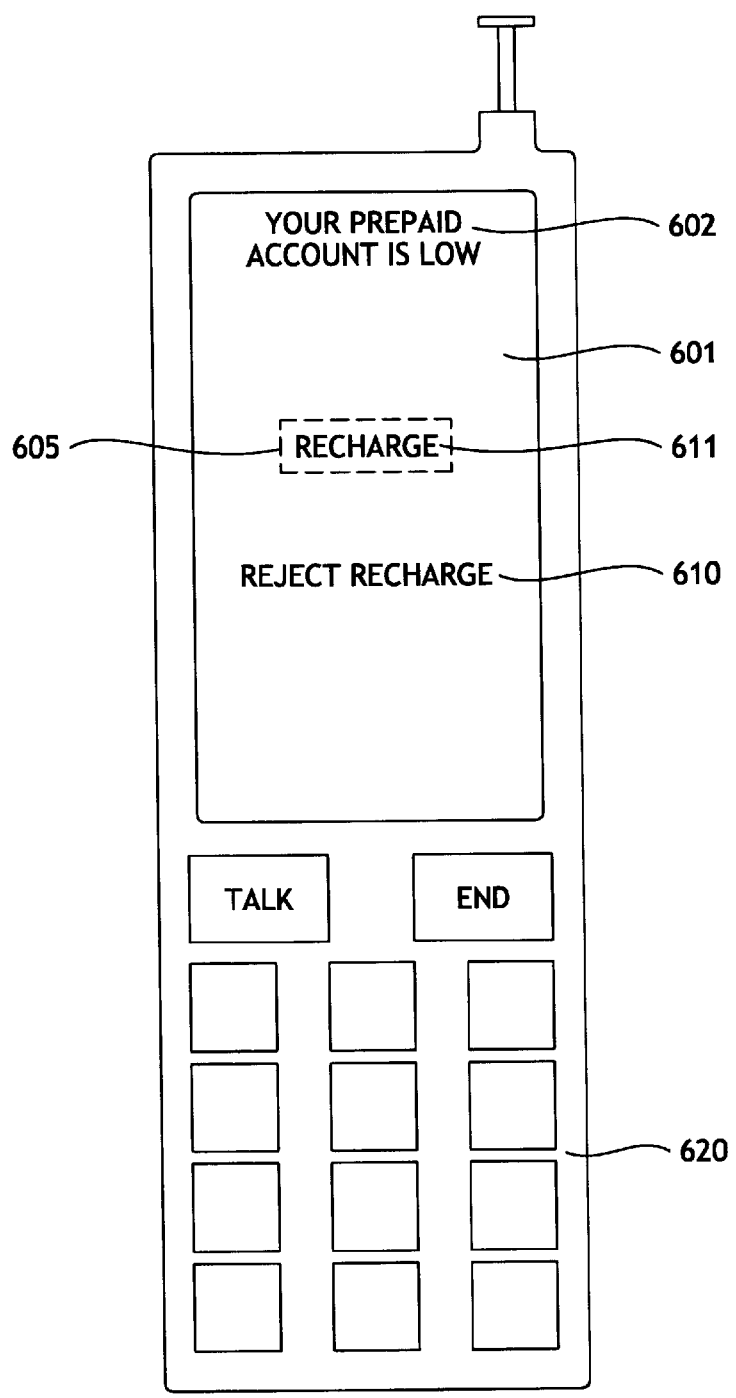
FIG. 6 shows the display of a WAP capable cellular telephone running a mobile client process.

FIG. 6 illustrates a telephone having a display (601) in accordance with the process of the present invention for giving the telephone user options on recharging his prepaid account. When the user receives the message from the SCP that the account may need recharging (depending on whether it is a push message or while in a call), the display (601) shown in FIG. 6 automatically appears. In one embodiment, an alert tone is also initiated.

The top portion (602) displays the message indicating that the user's prepaid account is low. The user is given the choices of recharging (611) or rejecting the recharge (610).

In order to accept or reject the recharge, the user places the cursor (605) over the desired indication (610 or 611) and pushes the send or talk key. The choice is transmitted through the WAP network to the SCP for processing as described above.

Figure 7:
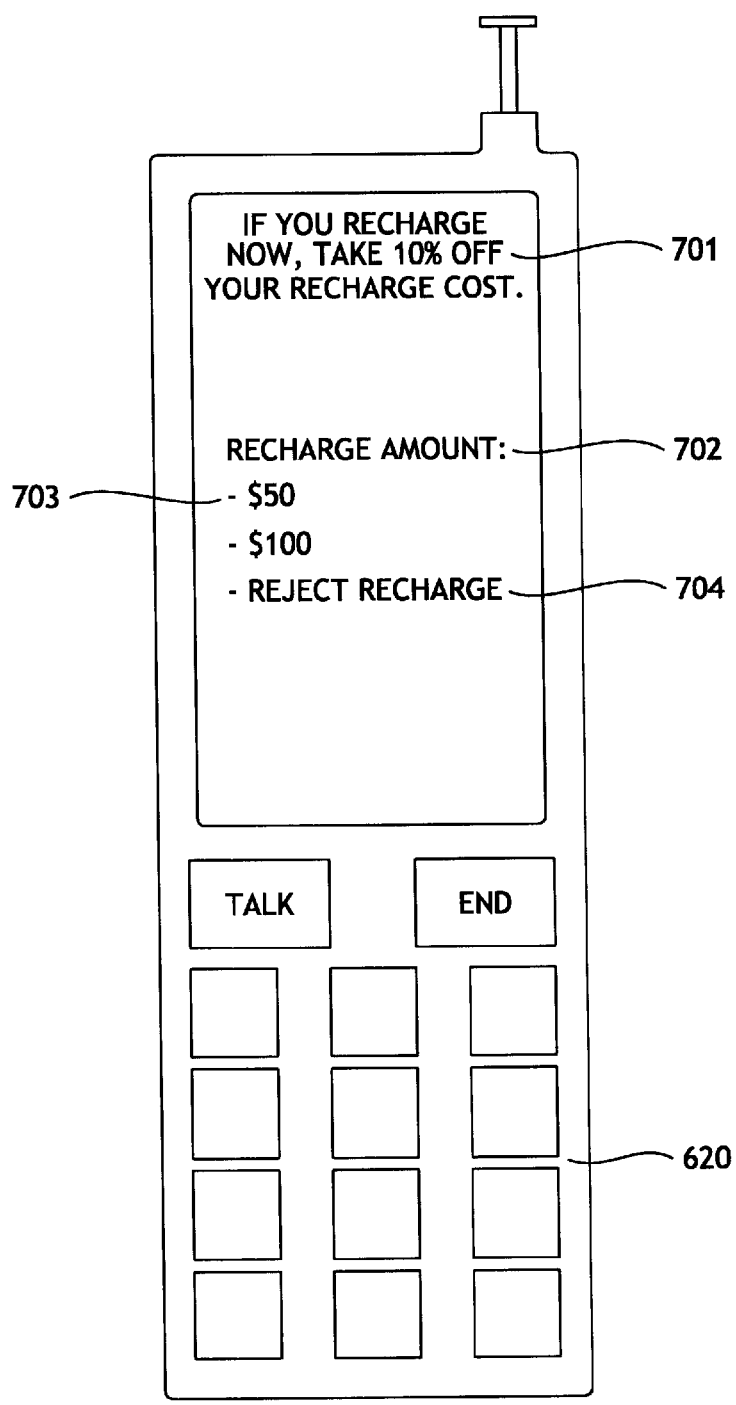
FIG. 7 shows an alternate embodiment display of a WAP capable cellular telephone running a mobile client process.

FIG. 7 illustrates another embodiment of the display of the present invention. This takes the form of mobile advertising, in which case, the recharge notification does not necessarily coincide with the predetermined threshold that the user has set for requesting a notification or warning for recharge. The service provider authorizes a discount for the user if he decides to recharge within a certain period of time (701). In this case, also, the user may be able to choose a recharge amount (702) or reject the recharge offer (704) depending on the type of promotion.

If the user desires to recharge, he can then place the cursor over the desired recharge amount (703) and push enter or talk to send the choice to the SCP for processing.

Alternate embodiments may divide up the display differently. For example, one embodiment may show telephone or system information such as battery or antenna strength or WAP functions located at the bottom of the screen and the other information at the top. Different size and style displays than that pictured in FIGS. 6 and 7 will have different orientations than that discussed.

FIG. 6 shows the cursor (605) as being a dotted or dashed line around the option. Another embodiment uses an inverse video display over each option that the cursor covers. Another alternate embodiment uses an arrow next to each option as the cursor.

The telephone user can move the cursor (605) down through the options using the telephone keypad keys (620). In the preferred embodiment, the cursor control keys are overlaid on the telephone number keys in order to save space. Once the cursor is positioned over the desired recharge option, a "enter" key or the talk key is depressed to activate this option. In an alternate embodiment, instead of depressing the "enter" key, the telephone's mobile client waits a predetermined time and then activates the option over which the cursor (605) is positioned.

In yet another alternate embodiment, if the recharge options are numbered, the telephone user can enter the number of the desired option using the telephone's keypad (620).

Upon entering the desired option, the display changes to indicate which option was selected and that the option is being processed. For example, when the cursor is positioned over the "recharge" option and the "enter" key is depressed, another screen (not shown) informs the user that the prepaid account is being processed.

Once the account has been recharged, the SCP sends an acknowledgment through the WAP system that is displayed on the telephone display informing the user that the account has been recharged. In one embodiment, the display informs the user the amount his account was recharged.

Since the present invention operates with other communication devices that are WAP capable, these other communication devices will appear differently than the telephone illustrated in FIG. 6. For example, if a WAP capable PDA uses the incoming call process of the present invention, the keypad and arrow keys may not be needed. The PDA may substitute a touch screen display for the keypad and arrow keys.

The criteria for recharging the prepaid account are not necessarily a fixed number of minutes or dollar amount prior to expiration of the account. This time or dollar amount can be configurable by the user. The customization can be done via an HTML interface, a WAP interface, an interactive voice response system (IVR) or manually by a customer service representative.

The prepaid recharge process of the present invention also provides the capability of interacting with the user in a language other than English through WAP mechanisms such as User Agent Profiles. In the preferred embodiment, the language is also a customizable feature.

The present invention also enables the user to select the currency with which to recharge the account. If the user is traveling away from his home country, he can access a menu and change the recharge currency to the local currency.

The user can also be presented with multiple payment options for recharging the account. In the preferred embodiment, the user's credit card number is stored with the system and is charged after every recharge transaction. Alternate embodiments use payment options such as putting the charge on the user's telephone bill for future payment, using an e-wallet account, or some other type of electronic payment option.

Figure 8:
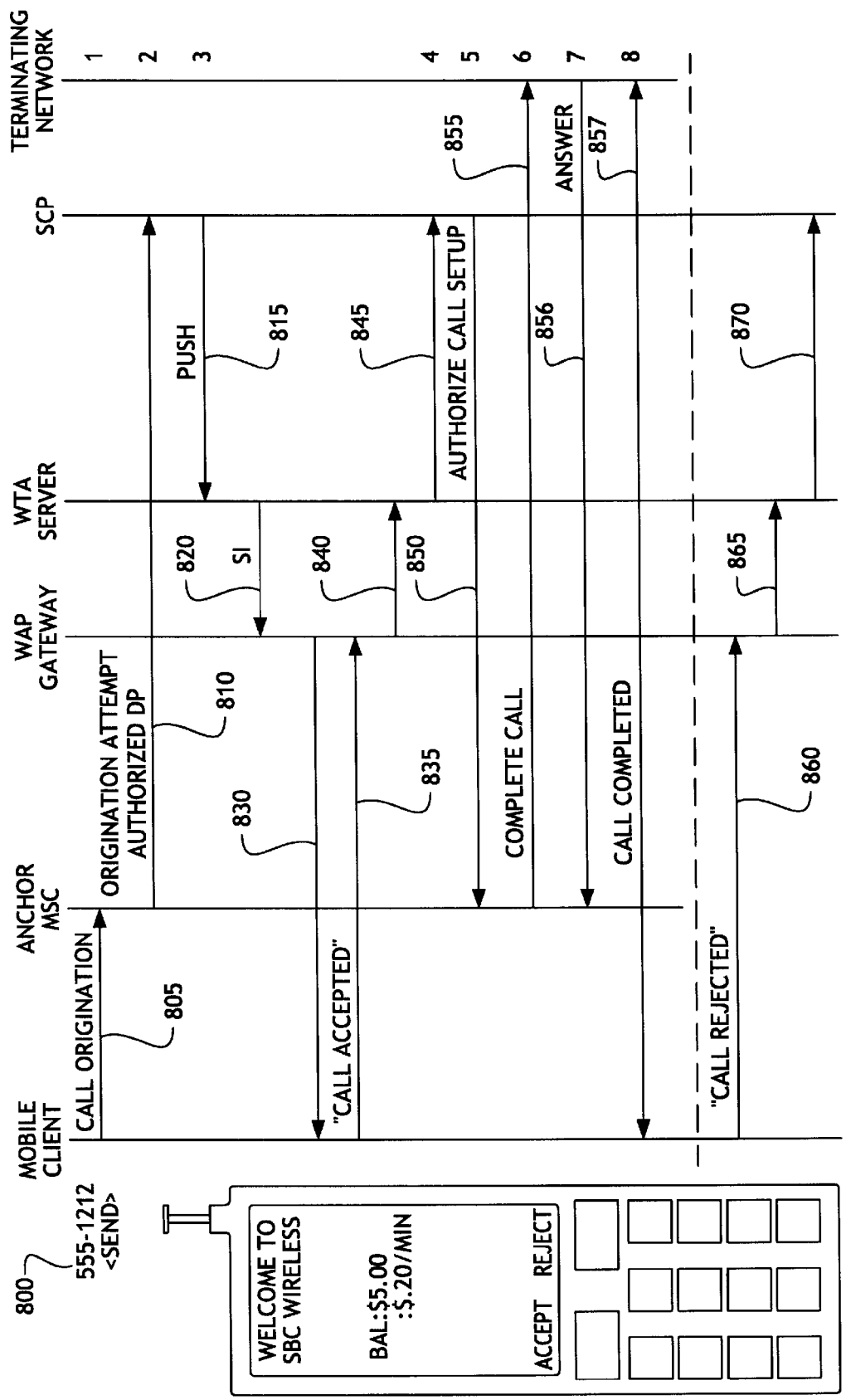
FIG. 8 shows a call flow diagram for the prepaid advice of charge process of the present invention.

An advice of charge process of the present invention also provides the user with information regarding the cost of the call prior to completing the call. FIG. 8 illustrates a flow diagram of this process.

The user keys in the telephone number that they desire to call and hits send (800). The mobile client sends this call origination message (805) to the MSC. The MSC transmits the origination attempt to the SCP (810) in order to get authorization for the call.

The SCP analyzes the dialed digits including any country code, area code, and/or prefix numbers and compares these to a telephone rate table. The rate table may be stored at the SCP or some other location that can be accessed by the SCP. In the preferred embodiment, the telephone rates are updated at any time. In other embodiments, the rates are updated daily or some other update frequency.

The SCP pushes a message back (815) through the WAP system via the WTA server and the WAP gateway (820) to the mobile client (830). The mobile client then displays the anticipated cost for the call on the telephone display for the user to see. In one embodiment, the mobile client also displays the remaining time or currency in the prepaid account so that the user can decide whether to continue with the call.

If the user decides to continue with the call, the accept button, or other such method of showing acceptance, is touched. The mobile client then sends the "call accepted" message to the WAP gateway (835). The WAP gateway sends the message to the WTA server (840) that then forwards it on to the SCP (845).

The SCP informs the MSC that the call has been authorized (850) so that the MSC can complete the call with the terminating network (855, 856, 857).

The advice of charge process of the present invention also provides the capability of interacting with the user in a language other than English through WAP mechanisms such as User Agent Profiles. In the preferred embodiment, the language is also a customizable feature.

The present invention also enables the user to select the currency with which to view the advice of charge. If the user is traveling away from his home country, he can access a menu and change the advice of charge currency to the local currency.

If the user compares the anticipated call charges and the account balance and determines that an account recharge is required to continue the call, the above recharge processes of the present invention are used. The user can also decide that he does not wish to continue the call at this point. In this case, the "reject" key or other form of declining is touched and the mobile client sends a "call rejected" message to the WAP gateway (860). This message is sent to the WTA server (865) and then to the SCP (870). Then SCP does not authorize the call to the MSC so that it does not continue.

In summary, the present invention provides a process for a mobile, WAP capable telephone to recharge a prepaid account and receive advice of charge through the WAP network. The prepaid account depletion reminder may either be a push message informing the user of the account reaching a certain level or it may be a warning while the user is in a call that the level has been reached.

We claim:

1. A method for recharging a prepaid telephone airtime account in a wireless access protocol system comprising a mobile client, a service control point, a wireless telephony application server, and a wireless access protocol gateway, the method comprising the steps of:

the service control point initiating a recharge request to the mobile client advising of a low prepaid telephone airtime account balance;

the mobile client replying to the service control point with a reply message indicating a response to the recharge request; and the service control point processing the prepaid telephone airtime account in response to the reply message.

2. The method of claim 1 wherein the reply message indicates a desire to recharge the prepaid telephone airtime account.

3. The method of claim 2 wherein the step of the service control point processing the prepaid telephone airtime account in response to the desire to recharge includes the step of the service control point adding a value to the prepaid telephone airtime account.

4. The method of claim 3 wherein the value added to the prepaid telephone airtime account includes a currency value.

5. The method of claim 3 wherein the value added to the prepaid telephone airtime account includes an airtime value.

6. The method of claim 3 wherein the value added is a predetermined value.

7. The method of claim 3 wherein the value added is a value set dynamically by a subscriber operating the mobile client.

8. The method of claim 1 wherein the reply message indicates a desire to let the prepaid telephone airtime account expire.

9. The method of claim 8 wherein the step of the service control point processing the prepaid telephone airtime account in response to the desire to let the prepaid telephone airtime account expire comprises the steps of:

the service control point letting the prepaid telephone airtime account expire; and if the user is in mid-call, the service control point transmitting a warning to the mobile client indicating end of balance.

10. The method of claim 9 and further including the step of if the user's prepaid balance becomes completely depleted, the service control point transmitting a message to the mobile switching center to terminate the call.

11. The method of claim 1 wherein the mobile client is resident in a wireless access protocol enabled wireless telephone.

12. The method of claim 1 wherein the mobile client is resident in a wireless access protocol enabled personal digital assistant having wireless communication capability.

13. The method of claim 1 and further including the step of the service control point transmitting an acknowledgement back to the mobile client in response to the reply message.

14. A method for recharging a prepaid telephone airtime account in a wireless access protocol system comprising a mobile client, a service control point, a wireless telephony application server, and a wireless access protocol gateway, the method comprising the steps of:

the service control point transmitting a recharge request to the wireless telephony application server advising of a low prepaid telephone airtime account balance;

the wireless telephony application server forwarding the recharge request to the wireless access protocol gateway;

the wireless access protocol gateway forwarding the recharge request to the mobile client;

the mobile client transmitting a recharge accepted message to the wireless access protocol gateway;

the wireless access protocol gateway forwarding the recharge accepted message to the wireless telephony application server;

the wireless telephone application server forwarding the recharge accepted message to the service control point; and the service control point adding value to the prepaid telephone airtime account in response to the recharge accepted message.

15. The method of claim 14 wherein the step of adding value to the prepaid telephone airtime account includes the step of adding a currency value.

16. The method of claim 14 wherein the step of adding value to the prepaid telephone airtime account includes the step of adding airtime value.

17. The method of claim 14 wherein the step of adding value to the prepaid telephone airtime account includes the step of adding a predetermined value.

18. The method of claim 14 wherein the step of adding value to the prepaid telephone airtime account includes the step of adding a dynamically changing value that is set by a user of the mobile client.

19. The method of claim 14 wherein the mobile client is resident in a wireless access protocol enabled wireless telephone.

20. The method of claim 14 wherein the mobile client is resident in a wireless access protocol enabled personal digital assistant having wireless communication capability.

21. The method of claim 14 and further including the step of the service control point transmitting an acknowledgement message to the mobile client in response to the step of adding value to the prepaid telephone airtime account.

22. The method of claim 14 wherein the step of adding value to the prepaid telephone airtime account includes the step of adding value to the prepaid telephone airtime account through a telephone billing system.

23. The method of claim 14 wherein the step of adding value to the prepaid telephone airtime account includes the step of adding value to the prepaid telephone airtime account through an e-wallet payment system.

24. The method of claim 14 wherein the step of adding value to the prepaid telephone airtime account includes the step of adding value to the prepaid telephone airtime account through a credit card system.

25. The method of claim 14 and further including the step of the mobile client configuring user changeable settings through the wireless access protocol system.

26. The method of claim 25 wherein the user changeable settings include a currency used by the wireless access protocol system.

27. The method of claim 25 wherein the user changeable settings include a threshold level at which the prepaid telephone airtime account balance initiates the recharge request.

28. The method of claim 25 wherein the user changeable settings include languages used by the wireless access protocol system and the mobile client.

29. The method of claim 25 wherein the user changeable settings include preferences used by the mobile client and the wireless access protocol system.

30. The method of claim 25 wherein the user changeable settings include notification types used by the wireless access protocol system and the mobile client.

31. A system for recharging a prepaid telephone airtime account used by a wireless communication device operating a mobile client, the system comprising:

a service control point that transmits a recharge request to the mobile client to advise the mobile client of a low prepaid telephone airtime account balance;

a wireless telephony application server that receives the recharge request from the service control point and retransmits the recharge request;

a wireless access protocol gateway that receives the retransmitted recharge request from the wireless telephony application server and forwards the recharge request to the mobile client; and the mobile client coupled to the wireless access protocol gateway and having means for transmitting a reply to the service control point indicating a response to the recharge request.

32. A method for recharging a prepaid telephone airtime account in a wireless access protocol system comprising a mobile client, a service control point, a wireless telephony application server, a mobile switching center, and a wireless access protocol gateway, the method comprising the steps of:

the mobile client initiating a telephone call to a telephone number;

the service control point analyzing the telephone number to determine an anticipated charge for the telephone call;

the service control point informing the mobile client of the anticipated charge;

the mobile client responding to the service control point with a reply message indicating a response to the anticipated charge; and the service control point processing the prepaid telephone airtime account in response to the reply message.

33. The method of claim 32 and further comprising the step of the service control point communicating with the mobile client through the wireless access protocol system.

34. The method of claim 33 wherein the step of the service control point communicating with the mobile client through the wireless access protocol system further comprises the steps of:

the service control point transmitting an anticipated charge message to the wireless telephony application server;

the wireless telephony application server transmitting the anticipated charge message to the wireless access protocol gateway; and the wireless access protocol gateway transmitting the anticipated charge message to the mobile client.

35. The method of claim 32 wherein the step of the mobile client responding to the service control point with a reply message further comprises the steps of:

the mobile client transmitting a response message to the wireless access protocol gateway;

the wireless access protocol gateway transmitting the response message to the wireless telephony application server; and the wireless telephony application server transmitting the response message to the service control point.

36. The method of claim 35 and further comprising the step of the service control point performing an action in response to the response message.

37. A method for recharging a prepaid telephone airtime account in a wireless access protocol system comprising a mobile client, a service control point, a wireless telephony application server, and a wireless access protocol gateway, the method comprising the steps of:

the service control point initiating a recharge request to the mobile client;

the service control point pushing an advertisement to the mobile client;

the mobile client replying to the service control point with a reply message indicating a response to the recharge request; and the service control point processing the prepaid telephone airtime account in response to the reply message.

* * * * *